July 3, 1951  M. N. McLELLAN  2,559,452

STEERABLE SLED

Filed March 26, 1946

INVENTOR.
Marvin N. McLellan
BY
ATTORNEY

Patented July 3, 1951

2,559,452

UNITED STATES PATENT OFFICE 2,559,452

STEERABLE SLED

Marvin N. McLellan, Cleveland, Ohio

Application March 26, 1946, Serial No. 657,202

4 Claims. (Cl. 280—22)

My invention pertains to a steerable sled whereby it may be put to alternative summer and winter use and avoid a semi-annual inutile storage. The drawing and description exemplify an application of the principle of my origination to alternative combinations of structural parts which adapt to use as a sled.

Objects of my invention have been:

Utilization of the strong yet light-weight tubular frame.

Economical, universal-joint connection between appositioned ends of a pair of alined supporting members, effected by a tube-enclosed coil spring suitably secured at its ends to the two tube ends, respectively. (See modification of tubular sled-runner joint of applicant's copending case Ser. No. 699,866.)

Contrivance of a plurality of additional joints between elements of a steering mechanism whereby actuation of corresponding, forward tube ends which are flexibly connected, each to its companion rearward tube end, may become angularly displaced.

In considering the drawings and the description of all illustrated details, it is to be realized that the scope of my invention comprehends many equivalent constructions and that the chosen exemplifications constitute only certain ones of equally feasible mechanical embodiments within the scope of the granted claims.

Figure 2:
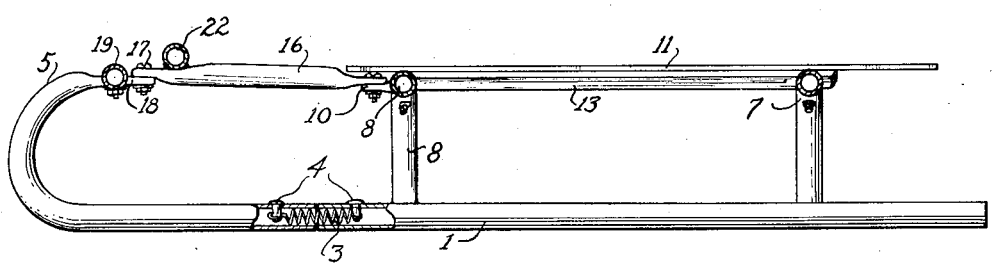
Figure 2 is a vertical, longitudinal and middle section viewed on line 2—2 of Figure 1.

The parallelly spaced runners 1 and parts of the frame for maintaining their substantial parallelism are of tubular stock. Each runner is of composite form to comprise a front section 2. The forward edges of the rear runner sections 1 abut the rear ends of the front runner sections and occupying each pair of alined hollow ends is a strong coil spring 3 which acts to maintain their abutment. The rear end of each spring is welded to the section 1 while the front end of each spring 3 is welded to a runner section 2. All four weld burrs have been designated with the numeral 4, as clearly appears to view in Figure 2. That flexible or steering connection permits a limited universal angular deflection and an extensible or contractible action of a reactive character, as will be readily perceived.

The forward ends of the two front runner sections 2 are bowed upwardly, the right one being numbered 5 and the left one 6. Near their rear ends the runner sections 1 are in crosswise connection through the agency of an arched tube 7 having its ends exemplifiedly welded to the runners respectively. Slightly rearwardly of the pivotal connections 3 and 4, another tubular arch 8 furnishes a second crosswise attachment between the runner sections 1.

Figure 1:
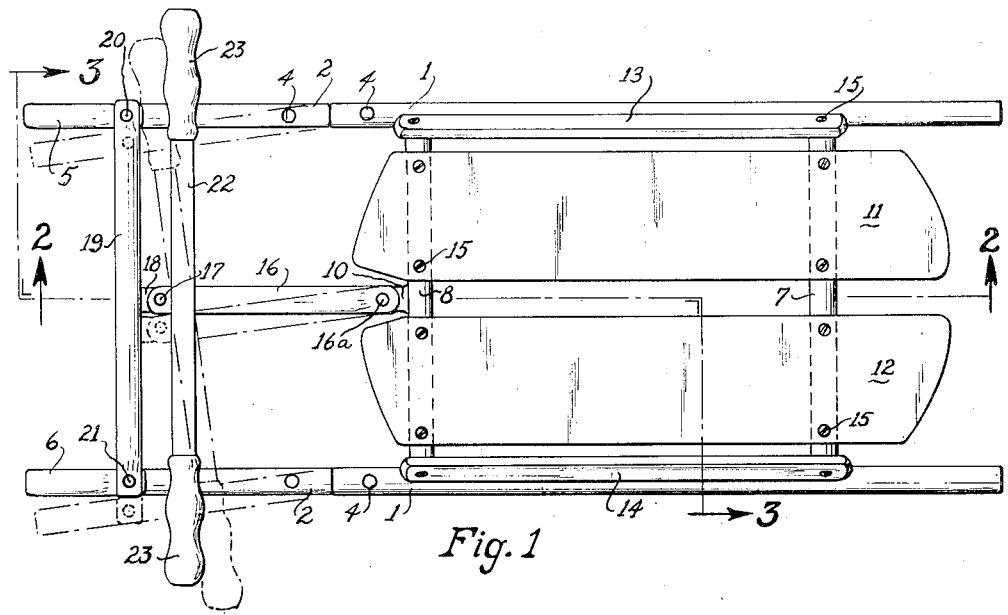
Figure 1 is a plan view of a sled showing in broken lines the front end thereof shifted to the left.
Figure 3:
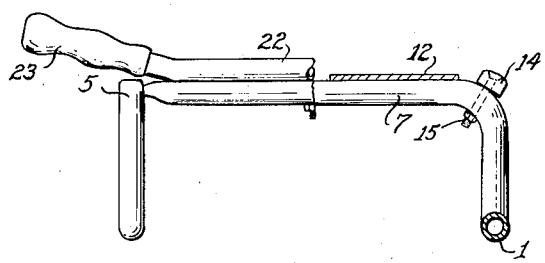
Figure 3 is a front elevation viewed on zig-zag line 3—3 of Figure 1.

In Figure 3 there has been indicated at 9 the left side point of weld of the arch 7 with the rear runner section 1 and in Figure 1 there has been numbered as 10 a forward extension carried by the middle of the arch 8. A pair of laterally spaced seat boards 11 and 12 appear surmounted across both of the arches 7 and 8, likewise two side hand grips 13 and 14, all four of which are secured in place by screws or bolts 15.

An arm or link 16 has its rear end pivotally connected at 16a with the extension 10. The front end of the arm 16 is pivotally connected at 17 with a rearward extension 18 from the middle of a cross bar or lever 19, the ends of which are in turn pivotally connected at 20 and 21 with the near extremities of the bowed ends 5 and 6 respectively. For effecting a displacement of the forwardly articulated elements just described, there is provided a double-armed steering lever 22 having its middle secured to the arm 16 just rearwardly of its forward pivot 17 and having at each of its ends a handle or footrest 23. As will be readily understood, any forward pressure exerted against the right side end of the lever 22 will shift certain of the steering mechanism parts to the positions in which they are shown by broken lines in Figure 1, serving thereby to cause a turning of the sled to the left. Meanwhile, the springs 3 will have become somewhat elongated consequent to their front ends having become turned laterally, thus to remain until hand or foot pressure against the right end of the lever has become released.

I claim:

1. In a sled, the combination of a frame, a pair of tubular runners each formed of two sections arranged with adjacent ends spaced apart, a coil spring having ends within and secured to each pair of adjacent section ends for flexibly connecting them and means for connecting said frame and runners.

2. In a sled, the combination of an articulated frame, a pair of tubular runners each formed of two sections arranged end to end, coaxial flexible means connecting each pair of said sections whereby to permit bodily displacements of the joined ends and assumption of angular relationships therebetween, said flexible means being welded to each section and means for securing articulated parts of the frame to corresponding sections of said runners respectively.

3. In a sled, a frame, runners carried by and beneath said frame and each comprising a pair of tubular sections having appositioned open ends and a structure having its opposite ends inserted in and secured to its sections respectively, the exposed middle of each of said connecting structures being capable of being bent whereby simultaneously to permit corresponding angular relationship between the tubular sections of both runners.

4. In a sled, a pair of alined tubular runner sections, another pair of tubular runner sections in laterally spaced arrangement relative to said first mentioned pair of sections, each pair of said runner sections having spacedly appositioned ends, a pair of structures firmly connected with said pairs of sections respectively, the middle portions of said structures being capable of being bent, opposite ends of each structure being inserted in and welded to its tubular sections and a superstructure connecting said composite runners.

MARVIN N. McLELLAN.

REFERENCES CITED

The following references are of record in the file of this patent:

UNITED STATES PATENTS

| Number | Name | Date |
|---|---|---|
| Re. 14,118 | Pearson | Apr. 18, 1916 |
| 201,556 | Post | Mar. 19, 1878 |
| 1,135,889 | Fox | Apr. 13, 1915 |
| 1,453,948 | Pottala | May 1, 1923 |
| 1,501,271 | Colson | July 15, 1924 |
| 1,546,805 | St. Pierre | July 21, 1925 |
| 1,790,500 | Fischer | Jan. 27, 1931 |
| 1,995,681 | Lamoy | Mar. 26, 1935 |
| 2,140,976 | White | Dec. 20, 1938 |
| 2,162,039 | Vastano et al. | June 13, 1939 |
| 2,343,662 | Goff | Mar. 7, 1944 |
| 2,439,921 | Brown | Apr. 20, 1948 |

FOREIGN PATENTS

| Number | Country | Date |
|---|---|---|
| 20,655 | Great Britain | 1894 |
| 584,159 | France | Nov. 13, 1924 |